United States Patent [19]

Arnold et al.

[11] Patent Number: 5,265,566
[45] Date of Patent: Nov. 30, 1993

[54] ASSEMBLED SEAL DISC FOR A CRANKSHAFT

[75] Inventors: Philip D. Arnold, Mt. Clemens; John P. Walsh, Farmington Hills, both of Mich.

[73] Assignee: General Motors Corporation, Detroit, Mich.

[21] Appl. No.: 812,301

[22] Filed: Dec. 23, 1991

[51] Int. Cl.$^5$ .......................... F16C 3/20; F02B 33/04
[52] U.S. Cl. .................................. 123/197.4; 74/597; 29/888.08
[58] Field of Search .......................... 123/65 R, 197.4; 74/595, 597; 29/888.08, 6.01

[56] References Cited

U.S. PATENT DOCUMENTS

| | | |
|---|---|---|
| 1,908,071 | 5/1933 | Snyder . |
| 2,237,685 | 4/1941 | Neuland .................. 74/597 |
| 2,378,686 | 6/1945 | Carstens .................. 74/597 |
| 3,748,925 | 7/1973 | Stewart .................. 74/597 |
| 4,033,016 | 7/1977 | Mayer .................. 74/597 |
| 4,305,311 | 12/1981 | McGill .................. 74/595 |
| 4,351,278 | 9/1982 | Gaschler et al. .............. 123/195 R |
| 4,554,893 | 11/1985 | Vecellio .................. 123/195.5 |
| 4,622,934 | 11/1986 | Oyama .................. 74/597 |
| 4,777,913 | 10/1988 | Staerzl et al. .............. 123/73 A |
| 4,829,642 | 5/1989 | Thomas et al. .............. 29/888.08 |
| 4,898,134 | 2/1990 | Breckenfeld et al. .......... 123/195 R |
| 4,947,807 | 8/1990 | Flaig et al. .............. 123/52 MV |

*Primary Examiner*—David A. Okonsky
*Attorney, Agent, or Firm*—Robert J. Outland

[57] ABSTRACT

A crankshaft for a two stroke engine requiring a seal disc on each crank pin is formed by forging, machining and heat treating without a seal disc and then applying a two part seal disc to each crank pin. The two parts of the seal disc have a mating interface in line with the center of the crank pin and a semi-circular recess in each part surrounds half of the crank pin. The parts are dimensioned to effect an interference fit on the crank pin when assembled with sufficient force. The parts are secured together by laser welding, bolts or by adhesive bonding. In the case of welding, the parts are assembled with dowels normal to the interface to maintain the proper alignment during welding and to reinforce the strength of the final assembly.

19 Claims, 2 Drawing Sheets

ASSEMBLED SEAL DISC FOR A CRANKSHAFT

TECHNICAL FIELD

This invention relates to crankshafts for a two-stroke engine and particularly to an assembled seal disc for such a crankshaft.

BACKGROUND

It is known in the art relating to two stroke engines, also known as two-cycle engines, that air may be inducted the crankcase to charge the cylinders. The crankcase may be divided into separate chambers, one for each cylinder, and the pumping action of the each piston assists in drawing air into each chamber during an up-stroke and then pressuring the chamber to force air into the cylinder during the down-stroke. Fuel is sprayed into each cylinder during its down-stroke, and lubricating oil is sprayed as a mist into the incoming air.

It is also known in such engines to form the chambers in the cast block by walls or webs which have circular openings concentric with the axis of the crankshaft, and seal discs on the crankshaft which fit within the openings to separate each chamber from the next. The U.S. Pat. No. 4,947,807 to Flaig et al shows an example of such an engine. The patent specifically discloses a V-block engine which uses the same crank pin for two cylinders in opposite banks of the engine. A seal disc on the crank pin and a corresponding wall are provided to maintain separate crankcase chambers.

Heretofore, two ways have been known for manufacturing crankshafts with seal discs on the crank pins. One is to assemble the crankshaft of individual main bearing journals, crank pins, counterweights and seal discs, wherein the seal discs have an eccentric opening slightly smaller than the crank pins, and each seal disc is pressed onto a crank pin with an interference fit prior to assembling the pins to adjacent counterweights. The other way is to forge the crankshaft in one piece and machine it to define the crank pins, counterweights, journals and seal discs. Each method of manufacture has certain advantages and may be selected for a given application.

In the case of forged crankshafts, it is not possible to forge the blank to a shape near that of the finished product in the region of the crank pin due to the seal disc requirement, thus mandating extensive machining to define the crank pin and an integral seal disc. Moreover, due to the mist lubrication method, it is desirable that the roller bearings ride directly on the crank pins and main journals, thereby requiring the crank pins and main journals to be surface hardened to 60 to 62 Rockwell C. Thrust faces on the seal discs and counterweights prevent the roller bearings from moving axially and also guide the connecting rods. Thus the thrust faces must also be hardened to meet performance standards. Accordingly, in addition to the extensive rough machining, the crank pins and journals must be hardened and ground to bearing quality and the thrust faces must be hardened as well. It is desirable to provide the advantages of the forged crankshaft at a reduced manufacturing cost.

SUMMARY OF THE INVENTION

The present invention is directed to a crankshaft construction which uses a separate seal disc assembly applied after forging, machining and selective hardening of the crankshaft thereby simplifying those operations. The invention is also directed to the separate two-part seal disc assembly for installation on a crankshaft. Two seal disc parts have mating or interface surfaces which align with a diameter of the crank pin and semicircular recesses, the recesses being sized to encompass half the crank pin circumference and to provide an interference fit when assembled to the crank pin. The two parts are secured together by welds, bolts or adhesives.

These and other features and advantages of the invention will be more fully understood from the following descriptions of certain specific embodiments of the invention taken with the accompanying drawings.

BRIEF DRAWING DESCRIPTION

DETAILED DESCRIPTION

Figure 1:
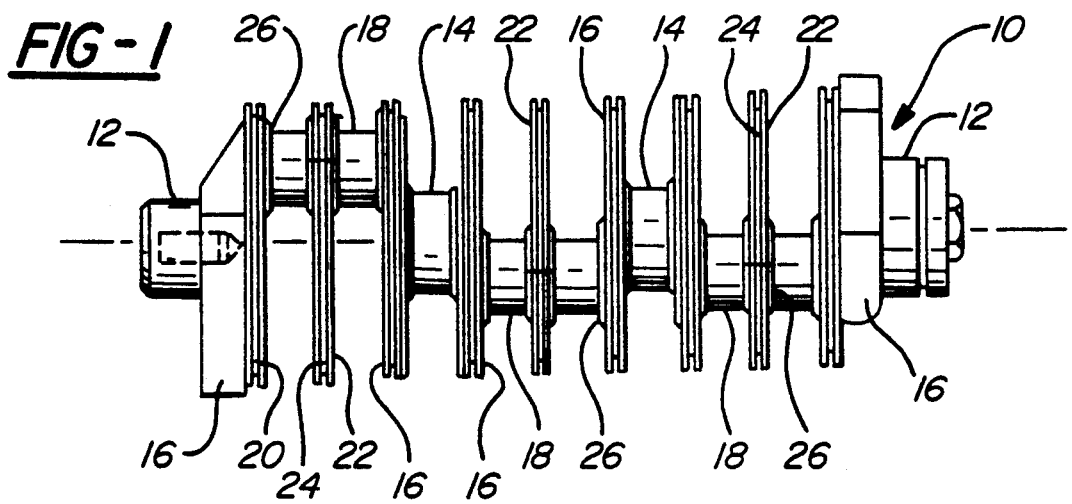
FIG. 1 is a side view of a crankshaft with assembled seal discs according to the invention.

Referring to FIGS. 1-5, a crankshaft 10 for a V-type six cylinder two stroke engine having separated crankcase chambers comprises end main bearing journals 12, two intermediate main bearing journals 14, crank throws including crank arms 16 optionally including counterweights at one end of each end journal 12 and both ends of journals 14. The crank throws include crank pins 18 connecting pairs of crank arms between each main journal. Each crank arm is circular and has a circumferential groove 20 for providing or receiving a seal. Additionally, a circular seal plate 22 is attached to each of the crank pins 18 midway between its neighboring counterweights 16 and has a circumferential groove 24, also for providing or receiving a seal. The various grooves or seals cooperate with circular openings of webs in the engine crankcase to separate the crankcase into compartments for managing the flow of intake air. Hardened thrust faces 26 are annular areas on the counterweights and seal discs surrounding the journals and crank pins to prevent associated roller bearings from moving axially, and also guide the connecting rods.

Figure 2:
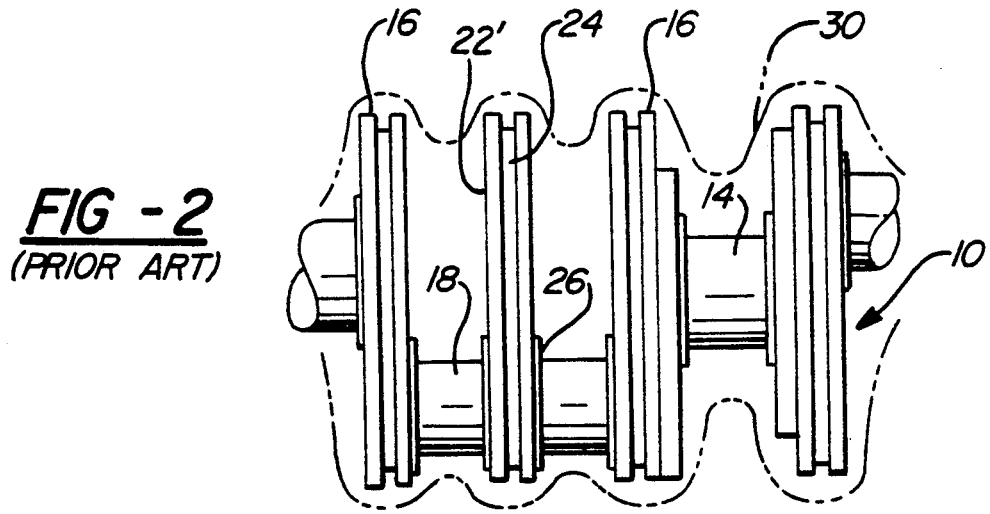
FIG. 2 is a portion of a prior art crankshaft with a superimposed forging outline.

FIG. 2, shows a portion of a crankshaft 10 forged and machined in the conventional manner with an integral seal disc 22 and further shows in phantom lines the forging 30 required. The machining and forging process required to produce these components is difficult and expensive. A large forged flange is necessary to form the integral gas seal disc. The metal flow for this deep draw is difficult because of the large diameter flanges with a thin cross section area. A forged crank also requires excess stock removal as evidenced by the difference between the forged shape 30 and the crank pin 18. In order to harden the crank pins and main journals, the crankshaft is carburized and hardened. This heat treatment can cause extreme distortion in the large diameter, thin seal discs which then require secondary processing to correct the geometry. Also, each end of the crank pin 18 has to be individually rough-cut and finish-cut machined because the integral seal disc separates the ends of the pin.

Figure 3:
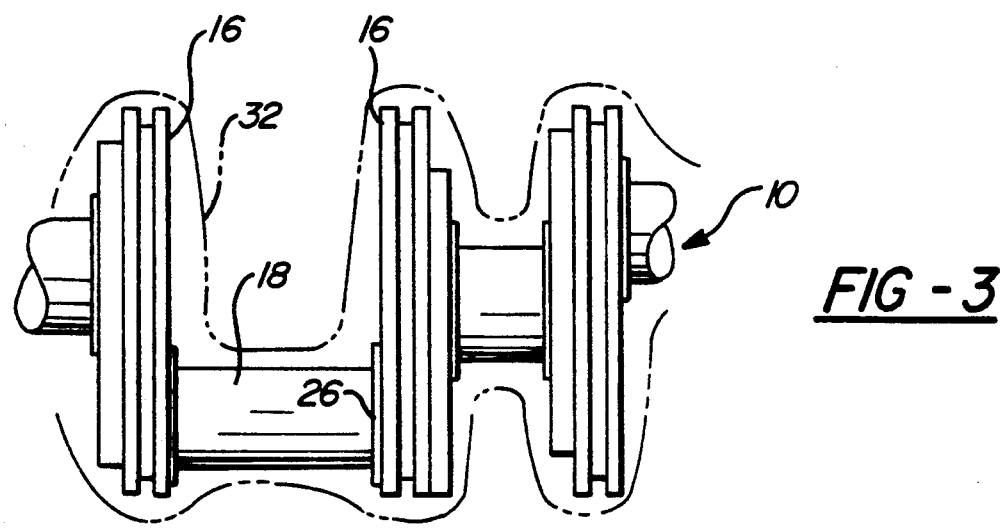
FIG. 3 is a portion of a crankshaft according to the invention with a superimposed forging outline.

To resolve many of the difficulties in forging and machining a crankshaft, it is proposed in a preferred embodiment, to separately form the seal discs and assemble them to the crank pins after crankshaft processing. Then, as shown in FIG. 3, the forging outline 32 is closer to near-net-shape of the crankshaft and would require much less stock removal. This would reduce machining time and extend tool life. By adding the separate seal disc after the hardening process the distortion problem of the seal discs is eliminated. Assembling a seal disc after machining allows the crank pin to be machined as a single pin between the counterweights instead of two pins. This eliminates three rough operations and six finish machining operations of the crankshaft. Finally, with a closer near-net-forging, flow lines are still present in the crankshaft after machining, resulting in a crankshaft with increased fatigue life.

In general, the assembled seal discs comprise a two-part disc which meet at a mating surface, each part being shaped with a semi-circular recess to surround half of the crank pin. The mating surface is aligned with a diameter of the crank pin and preferably is normal to a line passing through the center of the crank pin and the axis of crankshaft rotation. Thus since the crank pin is eccentric the mating surface is near one edge of the disc along a chord of the disc circumference, and one part is much smaller than the other. Each part, however, is symmetrical with respect to the line passing through the center of the crank pin and the axis. To obtain an interference fit, the diameter of the recess is slightly smaller than the crank pin (say, by 0.003 inch) and the mating surfaces do not quite touch when the parts are applied without force to the crank pin. To assemble the parts to the pin it is thus necessary to tightly clamp the parts to the crank pin and then securely fasten them together, thereby establishing and maintaining an interference fit. Three fastening methods are proposed: laser welding, bolting, and adhesive bonding.

Figure 4:
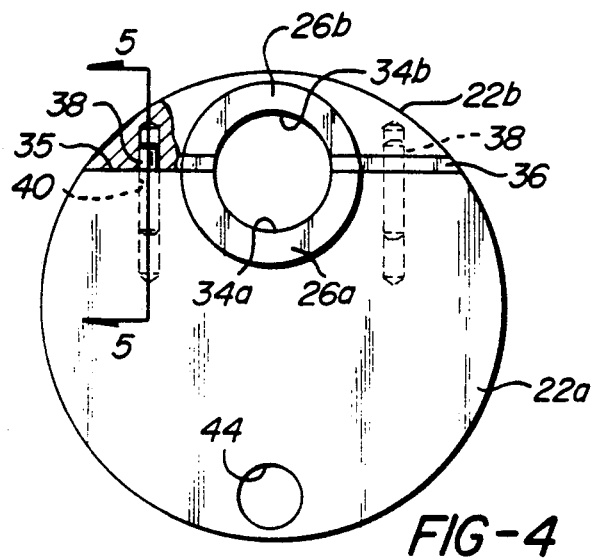
FIG. 4 is a partly broken away end view of a laser welded seal disc according to the invention.
Figure 5:
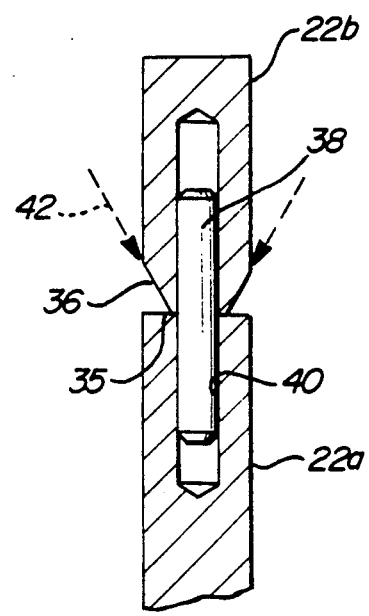
FIG. 5 is a cross section of a detail taken along line 5—5 of FIG. 4.

The laser welded embodiment of the sealing disc 22 is shown in FIGS. 4 and 5. The larger disc part 22a and the smaller disc part 22b have semi-circular recesses 34a and 34b in the part 22a and 22b, respectively, which together form an eccentric hole in the sealing disc which will encompass the crank pin 18. The recesses are surrounded by semi-annular thrust faces 26a and 26b, respectively. The mating surface 35 comprises a plane interface on either side of the recesses. On each side the part 22b has a chamfer 36 which slopes from the side of the disc by about 30°. A dowel 38 bridging the gap on either side of the eccentric hole is received in corresponding holes 40 normal to the mating surface 35 to pin the parts together and stabilize them prior to welding. A locating hole 44 is formed in a side of the large part 22a opposite the recess 34a. The chamfer 36 permits laser beams as indicated by arrows 42 to weld the interface from each side of the disc 22 to the edge of the recesses. The angular approach of the laser beam allows laser welding of the disc when closely adjacent a counterweight.

Fabrication of the disc 22 requires the parts 22a and 22b be rough machined with the recesses 34a and 34b smaller than the desired final size. The holes 40 in each part normal to the surface are drilled and reamed as matched pairs and are assembled with the dowels which are sized to provide a light interference fit, yielding a self-supporting free standing disc structure. The disc structure is held in a vise and the recess is machined to a diameter such as 0.001 to 0.003 less than that of the pin 18 to which it will be assembled. The parts 22a and 22b are then separated and reassembled on the pin 18, using the hole 44 to properly orient the disc on the pin. The dowels accurately locate the parts and help hold them in place in preparation for welding. Sufficient clamping force is applied to effect an interference fit on the crank pin and a laser welding beam is directed into the interface 35 at a 30° angle as shown by the dashed arrows 42 and moved along the interface between the pin and the edge of the seal disc to weld each portion of the interface in turn. Welding is performed on each side of the disc 22 either simultaneously or sequentially.

Controlling the depth of the weld is important to prevent overlap of the welds on opposite sides of the disc, and avoiding too high temperature is also a concern to avoid affecting the hardened thrust faces 26. In practice good welds have been made on the disc interface to achieve these goals and in addition no spattering on the crank pin occurred.

To limit the degree of porosity which may result from the welding process, the material for the seal disc should be aluminum-killed, low carbon, low sulfur and low phosphorous steel. The laser to be used may be a $CO_2$ laser or a Nd:YAG laser, for example. By using a laser of sufficient power and a beam splitter, both sides of the disc can be welded at the same time with a single laser.

Figure 6:
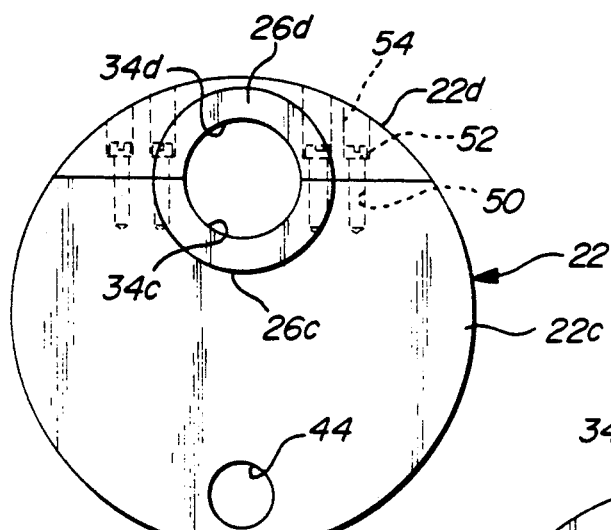
FIG. 6 is an end view of a bolt fastened seal disc according to the invention.

The bolt fastened embodiment of the seal disc 22 is shown in FIG. 6 and is similar to the laser welded version. Thus the disc 22 comprises large and small parts 22c and 22d, respectively, having recesses 34c and 34d and hardened thrust faces 26c and 26d. The interface of the parts is planar. Four bolt holes, two on either side of the recesses, are formed in the parts normal to the interface. The holes 50 in the large part 22c are drilled and tapped to receive the ends of bolts 52, and the corresponding holes 54 in the small part 22d are drilled and counter-bored to accommodate the heads of the bolts. A locating hole 44 is formed in the part 22c.

The assembly of the disc 22 to the crankshaft entails clamping the parts in a fixture as in the welding case, using the locating hole to orient the parts on the crank pin, and installing the bolts 52. The parts are designed to achieve an interference fit on the crank pin when the bolts are tightened.

Figure 7:
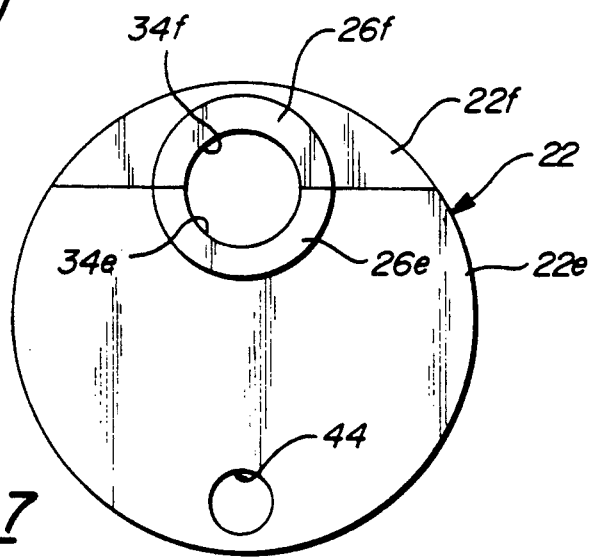
FIG. 7 is an end view of an adhesively bonded seal disc according to the invention.

The adhesive bonded seal disc embodiment is depicted in FIG. 7. This embodiment is like the bolted embodiment without the bolts and bolt holes and with a film of adhesive joining the parts. Thus the disc 22 comprises large and small parts 22e and 22f, respectively, having recesses 34e and 34f and hardened thrust faces 26e and 26f, and a locator hole 44. The interface of the parts is planar and aligned with the center of crank pin 18. Thus the mating surfaces of each part is a flat face. Adhesive is placed on the flat faces and the two parts are clamped together until the adhesive is cured. The fixturing and clamping are carried out as described above to obtain an interference fit on the crank pin. The curing temperature of the adhesive must be kept below a threshold which would affect the hardness of the journal bearings or the thrust face surfaces.

As an example of the adhesive bonding, an aluminum filled, modified epoxy-phenolic resin HT424 supplied by American Cyanamid Company cured for a time depending on the curing temperature, which may be, for example, 12 hours at 230° F. or 40 minutes at 340° F. After curing, the bonded interface had a tensile shear strength of 2,880 psi after being exposed to 300° F. temperatures for 192 hours.

It will thus be seen that the forged and machined crankshaft with an assembled seal disc is a practical alternative to a similar crankshaft with an integral seal disc and provides advantages of easier and more economical manufacture.

Other alternative embodiments, not shown, are also contemplated and should be considered within the scope of the invention in its broader aspects. For example, each seal disc could be made of more than two parts, and/or could include an annular retainer around a central core to retain the elements. Alternatively, a smaller part of the seal disc could be formed integral with an associated crank pin. This could be particularly effective in the case of split pins with an offset where the integral portion could form a web between pins and also provide part of a seal disc to which one or more larger parts are assembled. Also, the crankshaft could be of the built-up type with separately formed crank pins and the seal discs could be of one part each and press-fitted into the pins before their assembly into the crankshaft.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A crankshaft for a two-stroke engine having an axis of rotation and including:
    bearing journals on the crankshaft axis, crank pins offset from the axis, and a seal disc on each crank pin;
    each seal disc comprising a circular disc centered on the crankshaft axis and having an eccentric hole encompassing a crank pin with an interference fit;
    each disc being divided into two parts defining a common interface, each part containing a semi-circular recess corresponding to half of the eccentric hole to facilitate assembly of the parts to the respective crank pin; and
    means for fastening the two parts to secure the disc to the crank pin.

2. The invention as defined in claim 1 wherein the means for fastening comprises a weld at the interface of the two parts.

3. The invention as defined in claim 1 wherein the interface comprises a planar mating surface and the means for fastening includes dowels normal to the surface and bridging the surface.

4. The invention as defined in claim 1 wherein the interface comprises a planar mating surface; and
    the means for fastening includes holes in each part normal to the surface and aligned with holes in the other part, dowels seated in the respective holes and bridging the surface, and welds along the interface.

5. The invention as defined in claim 1 wherein the means for fastening the two parts comprises threaded fasteners.

6. The invention as defined in claim 1 wherein the means for fastening the two parts comprises threaded holes in one part normal to the interface, bores in the other part aligned with the threaded holes, and bolts in the bores and extending into the threaded holes.

7. The invention as defined in claim 1 wherein the interface extends normal to a line passing through the center of the eccentric opening and the center of the seal disc.

8. The invention as defined in claim 1 wherein the parts are symmetrical with respect to a line passing through the center of the eccentric opening and the center of the seal disc.

9. The invention as defined in claim 1 wherein the means for fastening comprises a film of adhesive bonded to each part.

10. A two-part seal disc for assembly to a crank pin of a crankshaft comprising:
    two unequal machined parts which, when assembled to a crank pin, comprise a circular disc having a mating interface of the parts passing through the center of the crank pin and offset from the center of the disc;
    each part having adjacent the mating interface a semi-circular recess for coupling with the crank pin, the recess having a diameter sufficiently smaller than the crank pin diameter to afford an interference fit with the crank pin; and
    means for joining the two parts together to engage the crank pin with an interference fit.

11. The invention as defined in claim 10 wherein each part includes a hardened surface area adjacent the recess to form an annular hardened area when joined together.

12. The invention as defined in claim 10 wherein welds along the mating interface join the parts together.

13. The invention as defined in claim 10 wherein the means for joining the two parts together comprises a plurality of threaded fasteners normal to the mating interface.

14. The invention as defined in claim 10 wherein the means for joining the two parts together comprises an adhesive bond at the mating interface.

15. A crankshaft for a V-type engine having longitudinally separated crankcase chambers, the crankshaft having an axis of rotation and including bearing journals on the axis, crank throws each including a pair of crank arms connected by at least one crank pin offset from the axis and a seal disc on said crank pin between the crank arms;
    each seal disc comprising a plurality of parts assembled into a circular disc centered on said axis and having an eccentric portion fixed to its respective crank pin, and
    means for fastening said parts together and to said crank pin,
    wherein all the assembled parts of each seal disc are initially formed separate from its respective at least one crank pin.

16. A crankshaft as in claim 15 wherein each crank throw includes only a single non-offset crankpin connecting the crank arms.

17. A crankshaft for a two-stroke engine having an axis of rotation and including:

bearing journals on the crankshaft axis, crank pins offset from the axis, and a seal disc on each crank pin;

each seal disc comprising a circular disc centered on the crankshaft axis and having an eccentric portion engaging a crank pin;

each disc having at least two parts, all formed separate from the respective crank pin; and means for fastening the disc to the crank pin.

18. The invention as defined in claim 17, wherein the means for fastening includes means defining an eccentric hole in the disc and encompassing the crank pin.

19. The invention as defined in claim 18, wherein the eccentric hole defining means grips the crank pin with an interference fit.

* * * * *